Jan. 6, 1970 J. E. ROYER 3,488,484

COMPUTING DEVICE FOR COMPUTING THE LOGARITHM OF THE RATIO OF TWO VOLTAGES

Filed Oct. 25, 1966 2 Sheets-Sheet 1

INVENTOR.
JEAN EDMOND ROYER
BY
Arnold & Roylance
ATTORNEYS

INVENTOR.
JEAN EDMOND ROYER
BY
Arnold & Roylance
ATTORNEYS

United States Patent Office 3,488,484

Patented Jan. 6, 1970

3,488,484

COMPUTING DEVICE FOR COMPUTING THE LOGARITHM OF THE RATIO OF TWO VOLTAGES

Jean Edmond Royer, St. Cloud, France, assignor to Rochar Electronique, Montrouge, Haute-de-Seine, France, a corporation of France Continuation-in-part of application Ser. No. 285,040, June 3, 1963. This application Oct. 25, 1966, Ser. No. 589,337
Int. Cl. G06g 7/26, 7/28; G06f 15/34
U.S. Cl. 235—197 10 Claims This invention relates to computing apparatus, and more specifically to apparatus for accepting an input signal in analog form and providing an output signal, also in analog form which is a mathematical function of the input signal.

This is a continuation-in-part of my application Ser. No. 285,040, filed June 3, 1963, now abandoned.

The prior art includes apparatus for performing mathemetical operations on analog signals, but these devices for the most part depend for their successful operation on special potentiometers or capacitors designed to exhibit some particular non linearity or include electronical feedback devices in which electrical signals are converted into rotary motion at some stage of the computing operation.

One object of this apparatus is to provide an apparatus for performing analog computing functions which avoids the low accuracy of special potentiometers and the like and the size and expense of servomechanisms.

Another object is to provide an apparatus for computing the logarithum of the ratio of an input analog signal to a second signal.

Yet another object is to provide an apparatus which digitally displays the value of a computer logarithm.

Briefly described the apparatus of this invention includes a plurality of attenuators which are successively inserted in a circuit between the input voltage and a comparator and between a reference voltage and the comparator the output of the comparator then being used to either keep each individual attenuator in the circuit or remove it, depending upon the relationship of the attenuated voltages. The process of insertion and testing is sequentially continued until the voltages at the attenuator are equal. At that point, a display unit provides a binary digital output display, and a converter provides an analog signal representative of the solution.

The above apparatus can be combined with similar apparatus to perform a variety of mathematical computations.

A still further object is to provide an apparatus which produces an analog voltage representative of the logarithm of an input signal.

Another object is to provide an apparatus which produces an analog signal representative of the product of two input voltages.

Another object is to provide an apparatus for producing an analog voltage which is representative of an exponential function of an analog input signal.

In order that the manner in which the foregoing and other objects are attained in accordance with the invention can be understood in detail, particularly advantageous embodiments thereof will be described with reference to the accompanying drawings, which form a part of this specification, and where:

Figure 1:
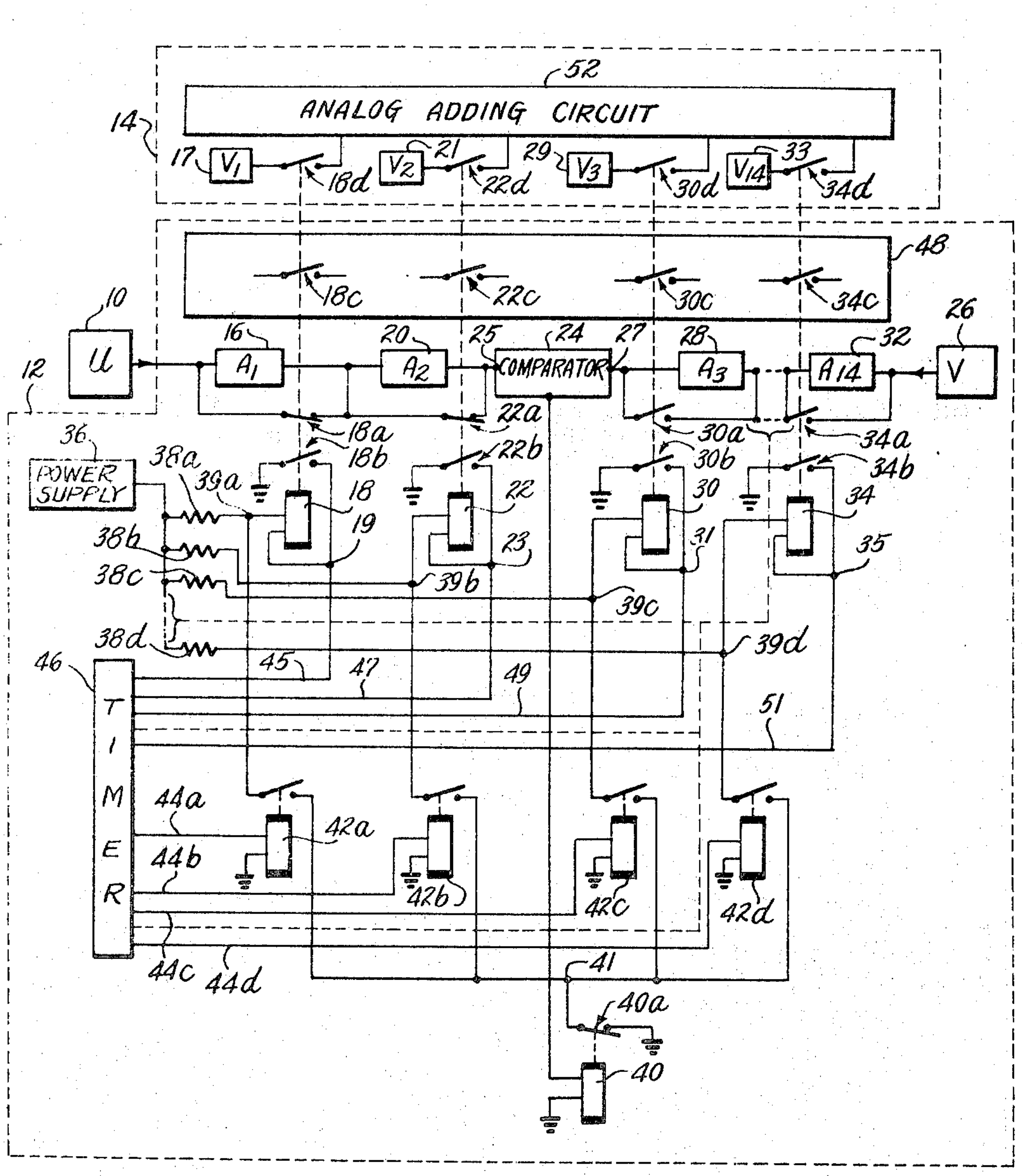
FIG. 1 is a schematic diagram, partly in block form, of a device for computing the logarithm of the ratio of an input analog voltage to a reference voltage in accordance with the present invention.

In FIG. 1, a function generator 10 generates a voltage U on which the computing operations of this embodiment of the system are to be performed. The output of generator 10 is connected to the computation and display unit 12 which includes attenuators and switching devices to be discussed in greater detail. Unit 12 also includes indicators for displaying the computed value in digital form. Multiple outputs of unit 12 are connected to multiple inputs of an analog adding unit 14 which will also be discussed in greater detail.

The input voltage to unit 12 is applied to an attenuator 16 which has a fixed attenuation coefficient which, for purposes of illustration, is selected to be equal to 0.10. Identifying this coefficient as $k_1$, it will be apparent that $$\log k_1 = -1$$

The output of attenuator 16 is connected to an attenuator 20 which is designed to have a preselected attenuation coefficient $k_2$, also equal to 0.10. The output of attenuator 20 is connected to one input terminal 25 of an amplitude comparator circuit 24. The other input terminal 27 of amplitude comparator circuit 24 is connected to the output of an attenuator 28 which is one of a group of twelve attenuators connected in cascade. Of these attenuators, only two are shown, attenuator 28 and attenuator 32, these two attenuators having attenuation coefficients $k_3$ and $k_{14}$. The intermediate attenuators not shown have coefficients $k_4 \ldots k_{13}$. These attenuators are designed to have attenuation ratios the product of which is equal to 0.10. The input terminal of attenuator 32 is connected to the output terminal of a voltage source 26 which generates a fixed reference voltage which, for purposes of illustration, is selected at 10 volts.

The output terminal of comparator 24 is connected to one terminal of the energizing winding of an electromagnetic relay 40, the other terminal of which is connected to ground. Relay 40 includes the energizing winding and a normally closed contact set indicated generally at 40*a*, one terminal of the contact set being connected to ground and the other terminal being connected to a junction 41. Relay 40 responds to an energizing signal from comparator 24 to open contact set 40*a* and disconnect junction 41 from ground.

A power supply 36 is connected via a resistor 38*a* to a junction point 39*a* to which is connected one terminal of the energizing winding of an electromagnetic relay 18, the other terminal of which is connected to a junction 19. Relay 18 controls the operation of contact sets 18*a–d*, contact set 18*a* being a normally closed set and contact set 18*b–d* being normally open contact sets. One terminal of contact set 18*b* is connected to ground and the other terminal is connected to junction 19. Junction 19 is also connected via a conductor 45 to one output terminal of a timing device 46. Timer 46 will be described in greater detail below.

The output of power supply 36 is also connected to one terminal of each of a plurality of resistors 38*b–d*, the other terminals of these resistors being connected to junctions 39*b–d*. Junction 39*b* is connected to one terminal of the energizing winding of an electromagnetic relay 22, the other terminal of which is connected to a junction 23. Relay 22 also has four contact sets 22*a–d*, one terminal of contact set 22*b* being connected to ground and the other terminal being connected to junction 23. Junction 23 is also connected via a conductor 47 to an output of timer 46. As will be recognized by one skilled in the art, contact sets **18*b* and 22*b* are closed when relays 18 and 22**, respectively, are energized and thereafter act as holding contacts for those relays.

Junction **39*c* is connected to one terminal of the energizing winding of an electromagnetic relay 30, the other terminal of which is connected to a junction 31 which is connected via a conductor 49 to an output of timer 46. Relay 30 also has four contact sets 30*a–d*, all of these contact sets being normally open. Contact set 30*b* is connected between ground and junction 31 to act as a holding contact set for relay 30. Junction 39*d* is connected to one terminal of the energizing winding of an electromagnetic relay 34, the other terminal of which is connected to a junction 35. Relay 34 has four contact sets 34*a–d*, contact set 34*b* being connected between junction 35** and ground to act as a holding set.

It will be understood that in an operative system other relays would be connected in similar fashion between relays 30 and 34 and would be supplied through other resistors connected to power supply 36, one such relay being provided for each attenuator.

Contact sets **18*a*, 22*a*, 30*a* and 34*a* are each connected in parallel circuit relationship with one of attenuators 16, 20, 28 and 32. Contact sets 18*a* and 22*a*, being normally closed contact sets, normally shunt attenuators 16 and 20 out of the circuit unless relays 18 and 22 are energized, while contact sets 30*a* and 34*a***, as well as similar contact sets associated with other relays not shown, are normally open and shunt their associated attenuators out of the circuit only when their relays are energized.

In addition to the outputs to conductors 45, 47, 49 and 51 are connected to the previously discussed relays, timer 46 also provides outputs on conductor **44*a–d*, and on other conductors between 44*c* and *d*, not shown, to the energizing windings of electromagnetic relays 42*a–d*, there being one such relay for each attenuator. Each of relays 42*a–d* is provided with a normally open contact set which is connected between one of junctions 39*a–d* and junction 41. As will be apparent to one skilled in the art, when one of relays 42*a–d* is energized, thereby closing its contact set, and when relay 40 is de-energized allowing contact set 40*a* to remain closed, the one of junctions 39*a–d* associated with the energized relay will be connected to ground and that the voltage at the junction will be removed, thereby de-energizing the associated one of relays 18, 22, 30 and 34**.

Timer 46 is of a type which can provide two types of outputs, one being a connection of one output terminal through the timer itself to ground, and the other being a control voltage in the form of a pulse. Ground signals are provided successively to conductors 45, 47, 49 and 51, while energizing pulses are provided successively to the output terminals connected to conductors **44*a–d***.

Contact sets **18*c*, 22*c*, 30*c* and 34*c*, as well as the contact sets associated with those relays not shown, are included within an indicator unit 48. Each of the named contact sets is connected to an indicating device which is operated when the contact set is closed. The indicators themselves can be indicators of any conventional type which are capable of displaying a simple binary quantity, i.e., either ON or OFF. In this system, indicator unit 48 displays digitally the solution computed by the apparatus of unit 12**.

These digital outputs are also provided to a digital to analog converter 14 which includes a plurality of constant voltage sources 17, 21, 29 and 33, the number of these sources being equal to the number of attenuators and relay units in unit 12. Each voltage source is connected to a normally open contact set such as **18*d*, 22*d*, 30*d*, and 34*d***. The *d* series contact sets interconnect each voltage source with an adding circuit 52 which combines the voltages provided by the individual sources when commanded to do so by closing of the contact sets. The output of the adding circuit is then necessarily the sum of the activated supplies. The values of the voltages from supplies 17, 21, 29 and 33 are initially selected to be proportional to the logarithm assigned to each different attenuator, so that the analog output from adding circuit 52 is the analog of the digital voltage displaced by unit 48.

An explanation of the operation of the apparatus of FIG. 1 is most easily undertaken by describing the calculation of the logarithm to base 10 of the number 54. We will assume that the number 54 is represented by a voltage U from unit 10 equal to 54 volts and the voltage $V_A$ supplied by unit 26 is equal to 10 volts. As mentioned above, the product of the attenuation coefficients of attenuators 28 through 32 is equal to 0.10, so that the voltage appearing at input terminal 27 to comparator 24 is equal to one volt.

It can be further assumed that the system is to provide a solution with an accuracy to 0.001, so that the twelve attenuators in series with source 26 and comparator 24 have attenuation coefficient $k_3 \ldots k_{14}$ such that:

| | |
|---|---|
| $\log k_3 = -0.4$ | $\log k_9 = -0.02$ |
| $\log k_4 = -0.2$ | $\log k_{10} = -0.01$ |
| $\log k_5 = -0.2$ | $\log k_{11} = -0.004$ |
| $\log k_6 = -0.1$ | $\log k_{12} = -0.002$ |
| $\log k_7 = -0.04$ | $\log k_{13} = -0.002$ |
| $\log k_8 = -0.02$ | $\log k_{14} = -0.001$ |

In this system, the code employed is a decimal binary code having a progression pattern of 1–2–2–4.

As will be recognized, when comparator 24 provides no output signal to switch 40, a solution has been reached. If the input voltage U from source 10 is initially equal to one volt, and if the voltage from unit 26 is 10 volts, it is obviously necessary to include all of the attenuators connected to input terminal 27 to diminish $V_A$ to one volt. Likewise, it will be clear that attenuators 16 and 20 should be eliminated from the circuit so that the one volt input signal can be applied directly to input terminal 25. However, with a larger voltage U applied, it will be necessary to diminish that voltage by leaving attenuators 16 and/or 20 in the circuit and possibly eliminating some of the remaining attenuators from the circuit. When a voltage U equal to 54 volts is applied to the input of the device, the first step of the operational cycle commences with the timer 46 providing a ground to output conductor 45 which provides a circuit for relay actuating winding 18 to be energized from power supply 36 through resistor **38*a*. Actuating relay 18 causes normally closed contact set 18*a* to be opened, removing the short circuit from attenuator 16 and placing that attenuator in its active state. Also, normally open contact set 18*b* is closed, holding relay 18 in its energized condition beyond the duration of the ground provided by timer 46**.

Attenuator 16, having an attenuation coefficient of 0.1, then reduces the 54-volt input signal to 5.4 volts which is connected through normally closed contact set **22*a* to terminal 25 of comparator 24. Thus, the comparator is comparing 5.4 volts with one volt and the output provided by comparator 24 energizes switch 40 which removes the ground from the input terminal of switch 42. Through conductor 44*a*, the timing device 46 then provides a pulse closing relay 42*a*. The normally open contact set of relay 42*a* closes, but no ground is provided to junction 39*a* because contact set 40*a* is open. Relay 18 therefore remains energized and attenuator 16 is allowed to remain in the circuit. This completes the first step of the cycle of operation of unit 12**.

In the second step of the operation cycle, timer 46 provides a connection via conductor 47 grounding one terminal of the actuating winding of relay 22, the other terminal of which is supplied from source 36 through resistor **38*b*. Operation of relay 22 closes holding contact set 22*b* and opens normally closed contact set 22*a*, removing the short circuit from attenuator 20 and allowing that attenuator to become active in the circuit. Attenuator 20 has an attenuation coefficient of .1, further reducing the input voltage to 0.54 volt which is applied directly to input terminal 25 of comparator 24. This voltage is lower than the voltage applied to input terminal 27 so that no output appears from comparator 24 and relay 40 is de-energized. Thus, when timer 46 provides, through conductor 44b, a short pulse closing relay 42b, junction 39d is grounded through the closed contact set of relay 42b and relay 22 is de-energized. Attenuator 20 is therefore again removed from operation in the circuit by the short circuit provided by contact set 22a**.

In the third step of the cycle of operation relay 30 is grounded by timer 46 through connection 49. Contact 30a is therefore closed, shunting attenuator 28 and removing from this portion of the circuit an attenauation coefficient $k_3$ equal to 0.398, the logarithm of which equal to −0.4. The voltage at terminal 27 therefore increases to 2.51 volts, a voltage lower than the 5.4 volts present at terminal 25. Switch 40 is therefore opened so that, at the end of the third step of the cycle of operation of timer 46, relay 30 remains closed because of the holding action of normally open contact set 30b and the shunting of attenuator 28 is maintained.

This process is repeated throughout the remaining cycles of operation, each relay being sequentially provided with a ground to be energized, checked, and then maintained energized or de-energized depending upon the relationship of the voltages at terminals 25 and 27. When equal voltages at those two terminals are obtained, it will be seen that the logarithm to the base 10 of 54 is equal to 1.732, the digit 1 being obtained by maintaining attenuator 16 in the circuit; digit 7 being obtained by removing from the circuit the attenuators having coefficients $k_3$, $k_4$ and $k_6$; eliminating from the circuit the attenuators of coefficients $k_8$ and $k_{10}$ giving the digit 3; and eliminating from the circuit the attenuator having coefficient $k_{12}$ giving the digit 2. As contacts 18c, 22c, 30c and 34c are connected to display device 48, the displace device shows the digital information characterizing the logarithm of $U/V$.

In addition, contacts 18d, 22d, 30d and 34d voltages are chosen from sources 17, 21 29 and 33 and are connected to the adder to provide an analog voltage also proportional to the logarithm of $U/V$.

Figure 2:
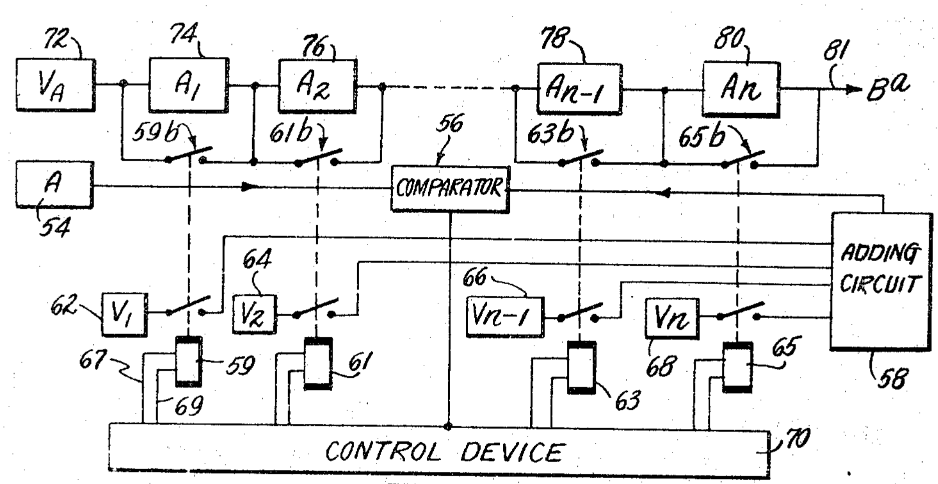
FIG. 2 is a schematic diagram, partly in block form, of an exponential function computing device incorporating the present invention.

In FIG. 2 is shown an apparatus for accomplishing the analog to digital conversion of a voltage A provided by a voltage source 54. A control device 70, which is substantially the same as the timing and control portion of FIG. 1, provides two output signals to each of a plurality of relay devices 59, 61, 63 and 65. A voltage comparator unit 56 is supplied at one input terminal by the voltage A from source 54, and at the other input terminal by the voltage from an addition circuit 58. A plurality of voltage sources 62, 64, 66 and 68 providing voltages $V_1$, $V_2$ . . . $V_{n-1}$ and $V_n$ are connected through contact sets of the relay devices to the inputs of addition circuit 58. As each relay device is energized, the voltage from the source associated with that relay is connected to the addition circuit. The input signal to the relay to accomplish this actuation is provided, in the case of relay 59, on a conductor 67, conductor 69 providing a holding circuit. The output of comparator 56 is connected to the control device to determine whether or not a holding signal will be provided to any given relay on a conductor 69. As the control device sequentially provides actuating signals to the relays, a voltage is sampled by the addition circuit and provided to comparator circuit 56 where it is compared with the input voltage A. As each voltage is used or discarded, by reopening the appropriate contact, a second contact set, one of 59b, 61b, 63b and 65b is held open or closed. Each of the series *b* contact sets is connected in parallel circuit relationship with one attenuator from attenuators 74, 76, 78 and 80. These attenuators are connected in series circuit relationship between a voltage source 72 which provides a voltage $V_A$ to an output terminal 81.

It will be recognized that the invention contemplates that other attenuators can be connected between attenuator 76 and attenuator 78, and that other voltage sources, relays and contact sets can similarly be connected between the components supplying $V_2$ and $V_{n-1}$ to the addition circuit 58. With the appropriate selected attenuation coefficients to attenuate the voltage $V_A$, the voltage appearing at terminal 81 will remain equal to $10^a$, *a* being the number corresponding to the analog voltage A.

Figure 3:
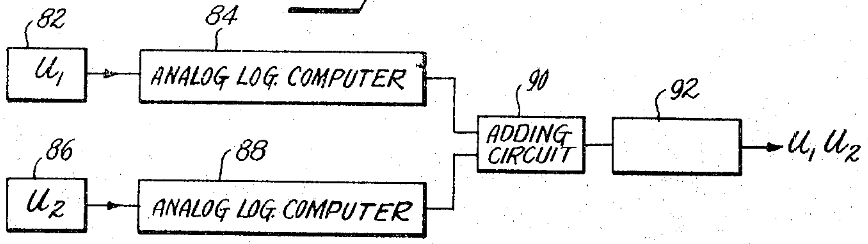
FIG. 3 is a schematic block diagram of a device for computing the product of two functions.

FIG. 3 shows an apparatus for simple calculation of the product of two functions by using two analog computers of the type described with reference to FIG. 1 and an exponential computer of the type shown in FIG. 2. In FIG. 3, voltages $U_1$ and $U_2$ are provided by voltage sources 82 and 86. Voltage $U_1$ is supplied to a logarithmic computer 84 of the type shown in FIG. 1 and voltage $U_2$ is connected to a second logarithmic computer 88 also of the type shown in FIG. 1. The analog outputs from computers 84 and 88 are both connected to an addition circuit 90. As is well known, the sum of the logarithm of two numbers is equal to the product of those two numbers. Thus, the output of adding circuit 90 is representative of the logarithm of $U_1U_2$. This electrical signal is supplied to exponential computer 92 of the type shown in FIG. 2, this circuit being operative to develop a voltage proportional to the antilogarithm of the input signal, the output of circuit 92 being the product use of $U_1U_2$.

Figure 4:
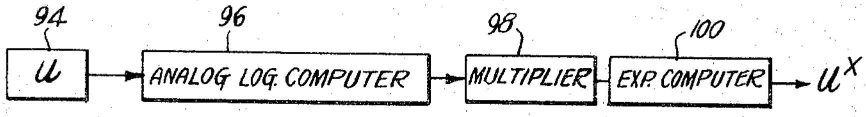
FIG. 4 is a schematic block diagram of a device for computing the power or root of a fuction.

The system of FIG. 4 is for the purpose of raising a number to a power or for extracting the root of a number. A voltage source 94 generates a voltage EU which is representative of the number. The output of source 94 is connected to an analog logarithmic computer 96 of the type shown in FIG. 1, the output of computer 96 being connected to a multiplier circuit 98. Multiplier 98 can be either an attenuator or an amplifier, i.e., can perform multiplication by a number either greater than or less than 1. The output of multiplier 98 is connected to an exponential computer 100 of the type shown in FIG. 2. As will be recognized, computer 96 produces an output voltage which represents the logarithm of the input voltage U. The multiplier then either multiplies this voltage by a preselected quantity X, being the power to which the number represented by U is to be raised, or divides its input signal by a quantity which represents the root which is to be taken of the value U. Exponential computer 100 then extracts the analog of the value, the output of computer 100 being the voltage U raised to the power X or the root of $U^x$.

Figure 5:
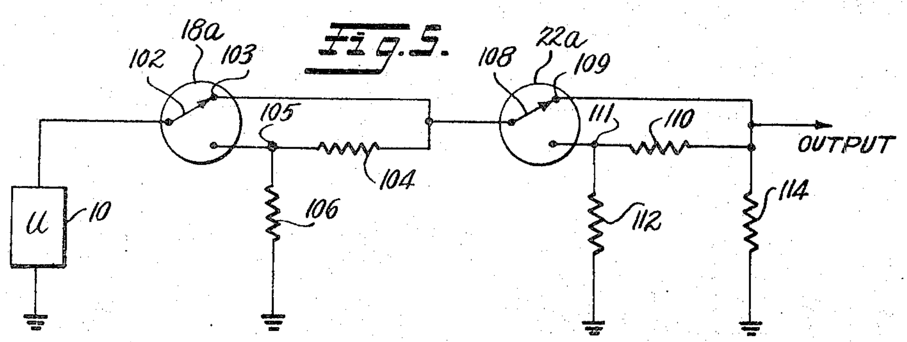
FIG. 5 is a schematic diagram, partly in block form, of a circuit usable in the embodiments of FIGS. 1–4.

FIG. 5 shows an attenuator system particularly useful in the circuits of FIGS. 1 and 2 and includes a source 10 which produces a voltage U, the output of source 10 being connected to the movable contact 102 of a single pole double throw switch 18a. A fixed resistor 104 is connected between fixed contacts 103 and 105 of switch 18a, contact 103 also being connected to the movable contact 108 of a single pole double throw switch 22a. A fixed resistor 106 is connected between fixed contact 105 and ground.

A fixed resistor 110 is connected between fixed contacts 109 and 111 of switch 22a, a fixed resistor 112 being connected between contact 111 and ground, and a fixed resistor 114 being connected between fixed contact 109 and ground. Contact 109 is also the output terminal for the attenuator, being connected to the appropriate utilization equipment.

In operation, when movable member 102 is in contact with contact 103 and when movable member 108 is in contact with contact 109, the circuit of FIG. 5 does not attenuate the voltage U. However, when either switch is in the opposite position, some attenuation is provided. Assuming that the resistors in the circuit of FIG. 5 have the following values:

Resistor 104=$r$
Resistor 106=R
Resistor 110=$r'$
Resistor 112=R'
Resistor 114=R' and that $$R=\frac{R'(R'+r')}{2R'+r'}$$

it will be seen that the input impedance of each individual attenuator is equal to the resistance of the series resistor of the preceding attenuator. This provides a series of independent attenuators which can individually be switched into and out of the circuit to modify the input voltage in accordance with the overall system functions, without altering the independent effect of the other attenuators left in the circuit.

As will be recognized by one skilled in the art, the various relays, switches and logic circuits described above can be either electromechanical or in the nature of solid state devices using transistors or other semiconductor circuit elements.

While certain advantageous embodiments have been chosen to illustrate the invention, it will be understood by those skilled in the art that various changes and modifications can be made therein without departing from the scope of the invention.

What is claimed is:

1. Apparatus for computing the logarithm of the ratio of two voltages comprising a source of voltage B; a source of voltage A; comparator circuit means having two input terminals and an output terminal for providing an output signal at said output terminal when the magnitudes of voltages provided at said input terminals bear a predetermined relationship to each other; a first plurality of attenuator circuits connected in series circuit relationship between said source of voltage B and one of said input terminals of said comparator circuit means, said attenuators having preselected attenuation coefficients; a second plurality of attenuator circuits connected in series circuit relationship between said source of voltage A and the other of said input terminals of said comparator circuit means, said attenuators having preselected attenuation coefficients; a plurality of switch means for selectively completing and opening individual low resistance paths in parallel circuit relationship with each attenuator of said first and second plurality of attenuator circuits; means for controlling said switch means to open each of said low resistance paths singly and in a predetermined sequence; and means responsive to the output voltage of said comparator circuit means for maintaining selected ones of said low resistance paths open to allow a permutation of said attenuator circuits to actively remain in said series circuits, the attenuators actively remaining having coefficients the sum of which is representative of the logarithm of the ratio of $A/B$.

2. Apparatus according to claim 1 wherein said comparator circuit means provides an output signal only when the one of said input terminals connected to source of voltage A is provided with a voltage greater than the other of said input terminals.

3. Apparatus according to claim 1 wherein said attenuation coefficients of said attenuators in said first plurality are equal to each other.

4. Apparatus according to claim 1 wherein said switch means comprises a plurality of relay devices each having a switchable conductive path, the number of devices in said plurality being equal to the total of said first and second plurality of attenuator circuits.

5. Apparatus according to claim 4 wherein said means for controlling said switch means comprises timing means; and power supply circuit means, said timing circuit means being connected to complete a circuit between said power supply circuit means and ground through each of said switch means individually and in a predetermined sequence.

6. Apparatus according to claim 5 wherein said means responsive to the output voltage of said comparator circuit means comprises voltage responsive means connected to said output terminal for opening and closing a path between a junction point and ground; and means for individually and sequentially connecting the power supply to each of said switch means to said junction in synchronism with the initial opening of each of said low resistance paths.

7. Apparatus according to claim 1 wherein said means of controlling said switch means comprises timing means; and power supply circuit means, said timing circuit means being connected to complete a circuit between said power supply circuit means and ground through each of said switch means individually and in a predetermined sequence.

8. Apparatus according to claim 1 wherein said means responsive to the output voltage of said comparator circuit means comprises voltage responsive means connected to said output terminal for opening and closing a path between a junction point and ground; and means for individually and sequentially connecting the power supply to each of said switch means to said junction in synchronism with the initial opening of each of said low resistance paths.

9. Apparatus for computing the logarithm of the ratio of two voltages comprising a source of voltage B; a source of voltage A; comparator circuit means having two input terminals and an output terminal for providing an output signal at said output terminal when the magnitudes of voltages provided at said input terminals bear a predetermined relationship to each other; a first plurality of attenuator circuits connected in series circuit relationship between said source of voltage B and one of said input terminals of said comparator circuit means; a second plurality of attenuator circuits connected in series circuit relationship between said source of voltage A and the other of said input terminals of said comparator circuit means; a plurality of switch means for selectively completing and opening individual low resistance paths in parallel circuit relationship with each attenuator of said first and second plurality of attenuator circuits; means for controlling said switch means to open each of said low resistance paths singly and in a predetermined sequence; means responsive to the output voltage of said comparator circuit means for maintaining selected ones of said low resistance paths open to allow a permutation of said attenuator circuits to actively remain in said series circuits; a plurality of voltage sources; adding circuit means having a plurality of input terminals each selectively connectable to one of said voltage sources, and an output terminal; and means for connecting selected ones of said voltage sources to corresponding ones of said adding circuit input terminals, the selected voltage sources corresponding to the selected ones of said low resistance paths, the sum of voltages from said selected sources being representative of the logarithm of $A/B$.

10. Apparatus for computing an exponential junction $B^a$ where B is a reference number and $a$ is a number represented by an analog voltage A comprising the combination of a plurality of voltage source means for providing an equal plurality of voltages having magnitudes which bear a predetermined relationship to each other; adding circuit means having an output terminal and a plurality of input terminals for providing at said output terminal the sum of all voltages provided at said input terminals; a first source of analog voltage; comparator circuit means having a first input terminal connected to said output terminal of said adding circuit means, a second input terminal connected to said source of analog voltage, and an output terminal, for providing at said output terminal a voltage only when said analog voltage is greater than the output voltage from said adding circuit means; means responsive to the output of said comparator circuit means for connecting selected ones of said plurality of voltage sources to the input terminals of said adding circuit means; a second source of analog voltage; a plurality of attenuator circuits connected in series circuit relationship, one end of the series circuit being connected to said second source; a plurality of shorting switches, each being connected in parallel circuit relationship with one of said attenuator circuits; and means for opening selected ones of said shorting switches in correspondence with said means for connecting selected ones of said plurality of voltage sources to said adding circuit means, an analog voltage representative of $B^a$ being thereby provided at the other end of the series circuit including said attenuators.

References Cited

UNITED STATES PATENTS

| | | | |
|---|---|---|---|
| 3,250,905 | 5/1966 | Schroeder et al. | 235—197 |
| 3,308,279 | 3/1967 | Kelling | 235—197X |
| 3,320,411 | 5/1967 | Martinez | 235—197 |

MALCOLM A. MORRISON, Primary Examiner

ROBERT W. WEIG, Assistant Examiner

235—150.5, 150.52, 193.5, 194